Dec. 20, 1932.    N. A. HALLWOOD    1,891,762
WEIGHING SCALE
Filed May 28, 1931
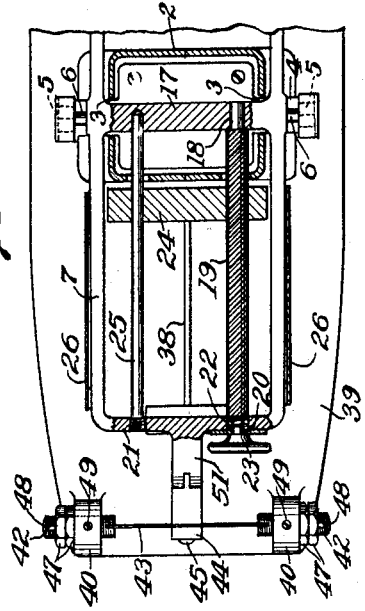
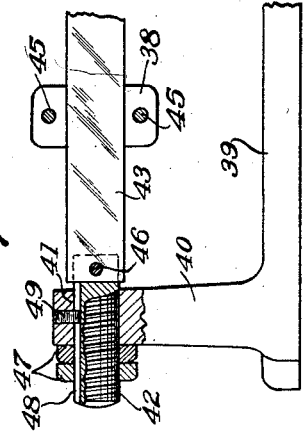
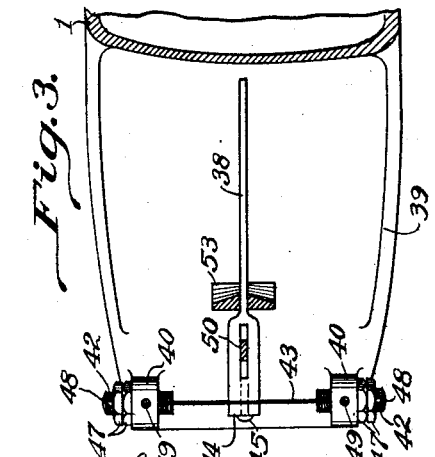
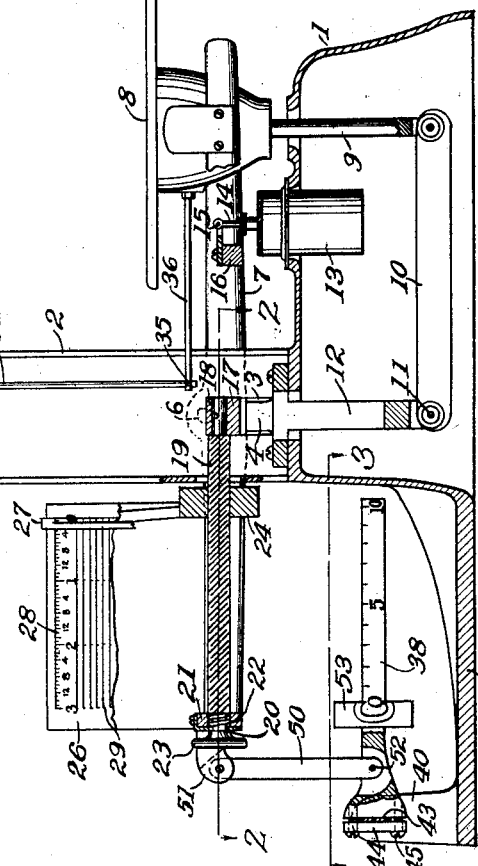
Inventor
N. A. Hallwood
By N. S. McDowell
Attorney Patented Dec. 20, 1932

1,891,762

UNITED STATES PATENT OFFICE

NATHAN A. HALLWOOD, OF COLUMBUS, OHIO

WEIGHING SCALE

Application filed May 28, 1931. Serial No. 540,668.

This invention relates to improvements in weighing scales of the so-called "even balance" type wherein the scale beam is pivotally mounted intermediately of its ends from the stationary scale base and wherein the beam, on one side of its pivotal or fulcrum mounting, receives a known weight and on the opposite side of said mounting receives the commodity to be weighed or the unknown weight, the said beam when balanced providing for proper weight indications.

The present invention constitutes a continuation in part of the disclosure set forth in my copending application Serial Number 484,973, filed Sept. 29, 1930.

In my aforesaid application, there is set forth an even balance scale of the character referred to but wherein the known weight is mounted on the scale beam on one side thereof and provided with means for adjusting the weight longitudinally of the beam toward and away from its fulcrum mounting, whereby the scale may be employed for weighing commodities of varying weights without employing the usual removably applied fixed or known weights, which have heretofore been characteristically employed in even balance scales. In my aforesaid application, the weighing capacity of the scale is limited for the reason that the beam is short in length which is desirable in order that the scale may be of compact nature and convenient to handle.

It is therefore the outstanding object of the present invention to increase the capacity of this type of scale without materially increasing the size thereof and to provide a scale whereby the successive weighing operations thereof may be carried out in a rapid and accurate manner.

More specifically, the invention consists in the employment of an auxiliary beam in connection with the usual beam of the scale and on which auxiliary beam is positioned an adjustable weight by which the capacity of the scale may be increased by the mere shifting thereof and to thereby eliminate the necessity of applying and removing loose individual weighing bodies of varying weight values.

It is also an object of the invention to simplify generally the construction of even balance types of scales and improve their operation as well as widen their scope of use.

With these and other objects in view, which will appear as the description proceeds, the invention consists in the novel features of construction, combinations of elements and arrangements of parts hereinafter fully described and pointed out in the subjoined claims.

In the accompanying drawing:

Figure 1 is a view in vertical section of a weighing scale constructed in accordance with the features of the present invention, Figure 2 is a horizontal sectional view taken on the plane indicated by the line 2—2 of Figure 1, Figure 3 is a similiar view taken on the line 3—3 of Figure 1, and Figure 4 is an enlarged detail sectional view taken through the pivotal connection of the auxiliary beam and the base of said scale.

Referring more particularly to the drawing, the numeral 1 designates the base of my improved scale. Arranged on top of the base is an open bottom weight indicating tower 2. Supported by the base 1 and extending through openings 3 formed in the side walls of the tower is a stationary yoke 4 which has its transversely spaced upstanding portions provided with bearing blocks 5 which are adapted to receive the knife edge fulcrum 6 projecting horizontally and rigidly from the opposite sides of a substantially rectangular beam 7. The fulcrum 6 is located approximately in the center of the length of the beam so that the latter may oscillate to a limited extent in a vertical plane in the usual manner common to this type of scales.

Pivotally supported at one end of the beam 7 is a weight receiver 8, which is adapted for the reception of the unknown weight, that is to say, the commodities which are to be weighed on the scale. This weight receiver is pivoted as usual on the beam 7 and includes the downwardly projecting stem 9 which terminates within the base 1 of the scale. A check rod 10 is pivotally connected at one end with the lower extremity of the stem 9 while the other end of the rod 10 is pivotally connected as at 11 with a vertically depending arm 12 unitarily formed with the beam and depending from the yoke 4. A dash pot 13 is stationarily carried by the base of the scale and the reciprocating rod 14 of the dash pot is pivotally connected as at 15 with a cross member 16 formed with the beam 7.

Provided centrally of the beam 7 is a rigid cross member 17 which also extends through the openings 3 formed in the lower part of the tower 2 and formed in this cross member is an opening 18 for rotatably receiving the reduced and threaded end of a weight adjusting screw 19, the opposite end of the screw being likewise journaled as at 20 in a bearing formed in a cross brace 21 formed integrally with the outer end of the beam 7. A coil spring 22 may be disposed around the latter end of the screw 19 and serves to exert sufficient pressure on the screw to maintain the same stationary against accidental rotation. Formed with the outer end of the screw 19 is a manipulating knob 23 for effecting the rotation of the screw. The screw 19 extends longitudinally of the beam 7 and is provided with an extremely coarse thread having a wide lead which provides for the rapid longitudinal shifting of an adjustable weight 24 which is carried by the screw 19 and an associated parallel rod 25. By the provision of the screw 19 of the rod 25, the weight 24 may be supported for lengthwise adjustment of the beam. The capacity of the scale may thus be varied by shifting the weight 24 with reference to the pivotal axis of the beam 7. It will be understood that when the weight is positioned adjacent the pivotal center of the beam, the beam will be in balance but as the weight is outwardly away from the pivotal center, the beam becomes unbalanced and depressed on the fixed weight side, and the greater the distance the weight 24 is shifted from the pivotal axis of the beam, the greater the weighing capacity of the scale will be.

Carried by the beam 7 on the side of the latter opposed to the weight receiver 8 is a chart member 26 and movable over this chart is an index arm 27 which is rigidly secured and carried by the weight 24. The chart is provided with a weight indicating scale 28 and also price computing indicia 29. By the provision of this scale 28 and the indicia 29 the merchant may at a glance determine the setting of the weight 24 and the price per pound of the commodity weighed. If desired the rear surface of the chart 26 may be provided with a similar scale so that the customer may determine the correctness of a given operation.

In order that these weighing operations may be carried out with extreme accuracy, there is mounted within the tower 2 a secondary weight indicating mechanism comprising a pointer 30 which is provided with a hub 31. The hub 31 is provided with knife edged trunnions seated within bearings formed in the stationary supporting brackets 32 secured to the side walls of the tower 2. The hub 31 is formed with a crank arm 33 with which is pivotally connected the upper end of a rod 34 which has its lower end pivotally connected as at 35 to a horizontally extending arm 36 rigidly carried by the outrider of the weight receiver 8. It will be seen that as the beam oscillates, the pointer 30 will rock back and forth over a graduated surface 37 formed in the upper portion of the tower 2 and with its visible sight opening provided in conjunction with the upper portion of the tower, producing the customary over and under region. Due to the length of the pointer and the manner of effecting its movement, various slight movements on the part of the beam will be magnified and rendered clearly visible by reference to the position of the pointer and the graduated surface 37.

While the scale construction just described is admirably suited for the weighing of articles possessing a weight not in excess of three pounds, which is the extent of the scale 28 of the chart, it has been found desirable to increase the capacity of the scale by the employment of an auxiliary beam 38 which is arranged within a cavity formed at one end of the scale and positioned above a foot extension 39 formed integral with the lower portion thereof. The outer end of this foot extension has formed therewith a pair of spaced upstanding lugs 40 which are provided with registering openings 41 for the reception of clamping screws 42. Attached to the opposed ends of the screws 42 are the ends of a torsional ribbon 43 to which is anchored one end of the beam 38. The beam is held in place to said ribbon by means of a clamping block 44 which is held in place in connection with the end of the beam by means of threaded fastening elements 45. The ends of the ribbon 43, which are anchored to the screws 42 by means of pins 46, are held stretched between the lugs 40 by the adjustment of the screws 42 and which adjustment may be fixed by the locking nuts 47 to prevent axial rotation of the screws 42 while the adjustment is being made the same is provided with longitudinal slots 48 in which are received the lower ends of set screws 49 threadedly carried by the upper ends of the lugs 40. The ribbon 43 which serves as the pivotal connection for the auxiliary beam 38 also keeps the auxiliary beam in a substantially horizontal position under normal weighing conditions. Connecting the auxiliary beam with the beam 7 is a link 50 which has its upper end pivoted to a projection 51 formed with the outer end of the beam 7, and its lower end pivoted as at 52 to the beam 38 and adjacent its pivotal connection.

Mounted for sliding movement upon the beam and shiftable longitudinally thereof is a weight or poise 53 which when arranged adjacent the pivotal connection of the beam, as shown in Figure 1, the beam will be in balance but as the weight is moved towards the free end of the beam away from such pivotal connection the beam becomes unbalanced and depressed on the fixed weight side of the scale. The weight 53 in contrast to the weight 24 may be moved quickly upon the beam to various weighing positions and frictionally held in place thereon when the scale is used for weighing commodities in excess of three pounds. In weighing commodities under this amount the weight 53 is not moved from its normal position and the weighing is done only by the shifting of the weight 24. However, when such commodities are in excess of, for example, over five pounds the weight 53 is moved to the five pound indication, after which the weight 24 is adjusted until the weight finds the commodity of the weight receiver 8.

In view of the foregoing it will be seen that the present invention provides an even balance weighing scale which while simple in construction, possesses many important advantages over the ordinary mound type of scale. First, the present invention utilizes the shiftable weight on its main weighing beam and thereby eliminates the employment of a plurality of separate removable fixed weights, which are apt to become lost or misplaced and which require considerable time to employ in effecting rapid weighing operations of commodities of different weight values. Second, the scale provides for an auxiliary weighing mechanism which may be brought in use when commodities are to be weighed having a weight in excess of the normal capacity of the scale. This mechanism, which is an auxiliary beam, is so arranged as to be wholly within the normal length of the scale or housing and thereby keep the scale within a size for practical and convenient handling thereof. The base of the scale is so formed that ready access may be had to the weight of the auxiliary beam for its operation and said beam may be viewable equally as well from the customer's side of the scale as from the merchant's so that the setting of the scale may at a glance be determined. The scale is exceptionally simple in construction, requires only a few parts for its working and should therefore lend itself readily to manufacturing economy.

What is claimed is:

1. In a weighing scale, a base, a beam pivotally mounted intermediate its ends on said base, a weight receiver pivotally carried by one end of said beam, a slidable weight carried by the other end of said beam, an auxiliary beam pivoted on said base, a torsional ribbon constituting the pivot for said auxiliary beam, a connecting link between said latter beam and the weight carrying end of said first beam, and a weight slidably positioned upon said auxiliary beam.

2. In a weighing scale, a base, a beam pivotally mounted centrally thereof on said base, a weight receiver pivotally carried by one end of said beam, a weight carried by the other end of said beam and shiftable longitudinally thereof, a second beam arranged below said first beam and having one end thereof pivoted to said base, the other end of said second beam being directed towards the pivot of said first beam, means for connecting said beams for movement with one another, and a weight slidably positioned upon said second beam.

3. In a weighing scale, a base, a beam pivotally mounted upon said base, a weight receiver carried by one end of said beam, an adjustable weight carried by the other end of said beam, an auxiliary beam mounted on said base and arranged below said first mentioned beam, a link connection between the two beams, a weight slidably positioned upon said auxiliary beam, and means for returning said beam to a normal position.

4. In a weighing scale, a base, a beam pivotally mounted intermediate its ends on said base, a weight receiver pivotally carried by one end of said beam, a shiftable weight carried by the other end of said beam, a second beam of a length substantially half of that of the first said beam arranged below the latter and lying normally parallel thereto, a pivot connecting the outer end of said second beam with said base, a link connection between the two beams, and a weight slidably positioned upon said second beam.

In testimony whereof I affix my signature.

NATHAN A. HALLWOOD.